United States Patent
Tong et al.

(10) Patent No.: US 11,927,843 B2
(45) Date of Patent: Mar. 12, 2024

(54) BACKLIGHT MODULE AND DISPLAY DEVICE

(71) Applicant: HKC CORPORATION LIMITED, Shenzhen (CN)

(72) Inventors: Xiaolan Tong, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/078,012

(22) Filed: Dec. 8, 2022

(65) Prior Publication Data

US 2023/0213805 A1 Jul. 6, 2023

(30) Foreign Application Priority Data

Dec. 31, 2021 (CN) .............................. 20111675432.9

(51) Int. Cl.
*G02F 1/1333* (2006.01)
*G02F 1/13357* (2006.01)

(52) U.S. Cl.
CPC .... *G02F 1/13336* (2013.01); *G02F 1/133314* (2021.01); *G02F 1/133317* (2021.01); *G02F 1/133322* (2021.01); *G02F 1/133328* (2021.01); *G02F 1/133605* (2013.01)

(58) Field of Classification Search
CPC ......... G02F 1/133328; G02F 1/133317; G02F 1/133314
USPC .............................................................. 349/58
See application file for complete search history.

(56) References Cited

U.S. PATENT DOCUMENTS

| | | | | |
|---|---|---|---|---|
| 6,580,477 | B1 * | 6/2003 | Cho ................... | G02F 1/133606 362/613 |
| 2018/0188588 | A1 * | 7/2018 | Ho ........................ | G06F 1/1637 |
| 2020/0341333 | A1 * | 10/2020 | Qiu ....................... | F21V 31/005 |
| 2022/0003388 | A1 * | 1/2022 | Liu ....................... | F21V 19/005 |
| 2022/0330443 | A1 * | 10/2022 | Liu ........................ | F16M 11/16 |
| 2022/0397795 | A1 * | 12/2022 | Zhou ................. | G02F 1/133603 |

FOREIGN PATENT DOCUMENTS

| | | | |
|---|---|---|---|
| CN | 112596303 | A | 4/2021 |
| CN | 113327515 | A | 8/2021 |
| CN | 114578617 | B * | 10/2023 |

* cited by examiner

*Primary Examiner* — Christopher M Raabe (57) ABSTRACT

A backlight module and a display device are disclosed. The backlight module includes a back plate and a plurality of light plates arranged on the back plate, where a seam is formed between adjacent light plates. The backlight module further includes a framework assembly that fixed to the back plate and arranged surrounding the light plates. At least a part of the framework assembly is disposed in the seam. A material of the framework assembly includes a reflective material.

20 Claims, 5 Drawing Sheets

BACKLIGHT MODULE AND DISPLAY DEVICE

CROSS-REFERENCE TO RELATED APPLICATIONS

This application claims the priority and benefit of Chinese patent application 2021116754329, entitled "Backlight Module and Display Device" and filed Dec. 31, 2021, with China National Intellectual Property Administration, the entire contents of which are incorporated herein by reference.

TECHNICAL FIELD

The present application relates to the field of display technology, and in particular, to a backlight module and a display device.

BACKGROUND

The description provided in this section is intended for the mere purpose of providing background information related to the present application but doesn't necessarily constitute prior art.

Mini LED backlight technology, which combines ultra-wide color gamut, high contrast, and thinness, has become the focus of future development of major manufacturers in the display industry. It has become a hot spot in the industry in the competitive research and layout of major manufacturers in the display industry, and various Mini LED backlight display terminal devices have been launched, including notebooks, monitors, TVs, and vehicle displays. Nowadays, large-size Mini LED light plates basically use PCB (Printed Circuit Board) substrates and glass substrates. The glass substrate has a complex process and is expensive and cannot be mass-produced, so most of them use low-cost PCB substrates.

To realize the large-scale application of Mini LED display, it must be realized by assembling multiple light plates together, but the splicing of light plates will produce seams. In the process of displaying a picture, the light at the seam position cannot be re-reflected and reused, thus generating dark lines, making the brightness of the display area of the backlight module uneven, and affecting the display effect of the display device.

SUMMARY

In view of the above, it is therefore a purpose of the present application to provide a backlight module and a display device that can solve the problem of seam dark lines.

The application discloses a backlight module. The backlight module includes a back plate and a plurality of light plates. The plurality of light plates are arranged on the back plate. A seam is formed between adjacent light plates. The backlight module further includes a framework assembly. The framework assembly is fixed to the back plate and is arranged around the light plates. At least a part of the framework assembly is disposed in the seam. The material of the framework assembly includes a reflective material.

Optionally, the framework assembly includes a plurality of support rods and a plurality of frame rods. The plurality of support rods are arranged in an array on the back plate and are connected to the back plate. The support rods are respectively arranged corresponding to the corners of the light plates. The adjacent support rods are connected by a frame rod. At least a part of the frame rods are located in the seams.

Optionally, the back plate includes a plurality of clamping holes and a plurality of grooves. The clamping hole penetrates through the back plate. The support rods are connected with the clamping holes in a one-to-one correspondence. The groove is arranged on the side of the back plate facing the light plates, and does not penetrate through the back plate. The frame rods are matched and fitted with the grooves in one-to-one correspondence. One end of the frame rod is arranged in the groove and abuts with the groove bottom of the groove.

Optionally, the clamping hole includes a sink hole and a through hole that are vertically coupled. The sink hole is arranged in the side of the back plate facing the light plates. The depth of the sink hole is the same as the depth of the groove, and the side wall of the sink hole is coupled with the groove. The through hole is arranged in the side of the back plate away from the light plates. The cross-sectional dimension of the through hole is smaller than the cross-sectional dimension of the sink hole. The support rod includes a first clamping portion, a transition portion and a second clamping portion. The cross-sectional dimension of the first clamping portion is larger than the cross-sectional dimension of the through hole, and the first clamping portion is clamped with the side of the back plate away from the light plates. The cross-section of the second clamping portion corresponds to the cross-section of the sink hole, and is disposed on the side of the back plate facing the light plates, and the second clamping portion is engaged with the bottom of the sink hole, and the side wall of the second clamping portion is connected with the frame rod. The shape of the transition portion corresponds to the shape of the through hole. Both ends of the transition portion are respectively connected with the first clamping portion and the second clamping portion.

Optionally, the backlight module further includes an optical assembly, and the optical assembly is disposed on the side of the light plates away from the back plate. The support rod further includes a bearing portion, the bearing portion is disposed at an end of the second clamping portion away from the first clamping portion, and abuts with the optical assembly.

Optionally, the frame rod includes a hook, the hook is arranged at one end of the frame rod away from the back plate, and the hook is engaged with the side of the light plate away from the back plate.

Optionally, the back plate includes a plurality of removal holes, the removal holes penetrate through the back plate and are arranged at the seams; along the width direction of the seam, the size of the removal hole is larger than the width dimension of the frame rod, and the frame rod and two adjacent light plates cover the removal hole.

Optionally, the material of the framework assembly further includes an elastic material, and the framework assembly is injection-molded on the back plate.

Optionally, the back plate further includes a plurality of connecting holes, the connecting holes penetrate through the back plate, correspond to the light plates one-to-one, and are located directly below the light plates. The backlight module further includes a backlight control chip and a connector, and the connector passes through the connecting hole and is coupled with the backlight control chip and the light plate.

The present application discloses a display device. The display device includes a display panel and the abovementioned backlight module. The display panel is disposed on a light-emitting side of the backlight module.

Compared with the solution for solving the problem of dark lines at the seam by arranging a reflective sheet at the seam to reflect the light entering the seam, the present application first adds a framework assembly in the backlight module, the framework assembly is arranged around the light plates, which can align the installation of the light plates thus facilitating the installation of the light plates. Secondly, the material of the framework assembly includes a reflective material, so that the framework assembly has a reflective effect, and can reflect the light entering the seam back, so as to solve the problem of dark lines in the seam. Furthermore, since the framework assembly is first installed on the back plate as a whole, before then the light plates are installed, the installation of the framework assembly does not need to be like sticking reflective sheets, where the sticking steps must be repeated many times and the position must be aligned each time. Therefore, by adopting the technical solution of the present application, the problem of dark lines at the seam is solved, and the assembly efficiency of the backlight module is also greatly improved.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

In addition, terms "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Hereinafter this application will be described in further detail with reference to the accompanying drawings and some optional embodiments.

Figure 1:
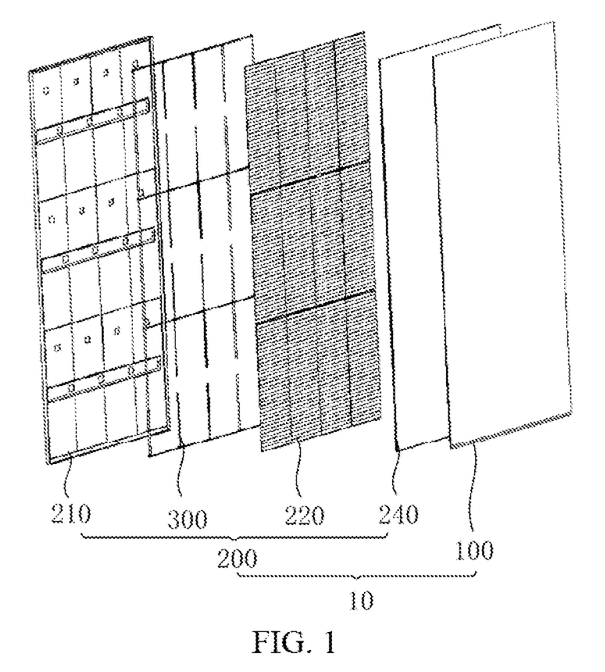
FIG. 1 is a schematic diagram of a display device provided by the present application.
Figure 2:
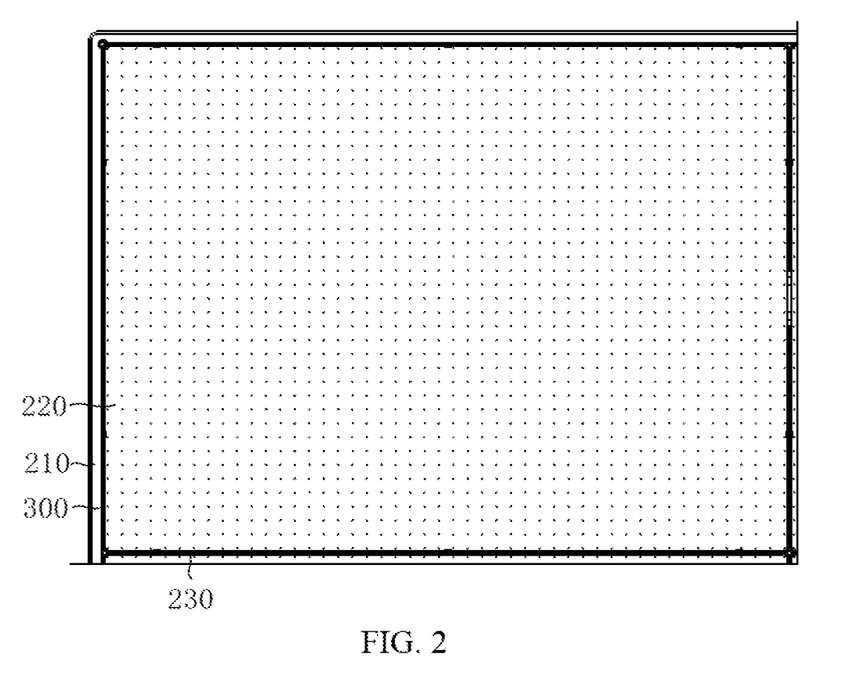
FIG. 2 is a partial plan view of a backlight module provided by the present application.

As shown in FIG. 1 and FIG. 2, the present application discloses a display device 10. The display device 10 includes a display panel 100 and a backlight module 200. The display panel 100 is disposed on a light-emitting side of the backlight module 200. The backlight module 200 includes a back plate 210 and a plurality of light plates 220. The plurality of light plates 220 are disposed on the back plate 210, and a seam 230 is formed between adjacent light plates 220. The backlight module 200 further includes a framework assembly 300. The framework assembly 300 is fixed to the back plate 210, and is arranged around the light plates 220. At least part of the framework assembly 300 is disposed in the seam 230. The material of the framework assembly 300 includes a reflective material, and the reflective material includes silicon oxide, silver, or the like.

Compared with the solution for solving the problem of dark lines at the seam 230 by arranging a reflective sheet at the seam 230 to reflect the light entering the seam 230, the present application first adds a framework assembly 300 in the backlight module 200, the framework assembly 300 is arranged around the light plates 220, which can align the installation of the light plates 220 thus facilitating the installation of the light plates 220. Secondly, the material of the framework assembly 300 includes a reflective material, so that the framework assembly 300 has a reflective effect, and can reflect the light entering the seam 230 back, so as to solve the problem of dark lines in the seam 230, making the brightness of the display region of the backlight module 200 more uniform. Furthermore, since the framework assembly 300 is first installed on the back plate 210 as a whole, before then the light plates 220 are installed, the installation of the framework assembly 300 does not need to be like sticking reflective sheets, where the sticking steps must be repeated many times and the position must be aligned each time. Therefore, by adopting the technical solution of the present application, the problem of dark lines at the seam 230 is solved, and the assembly efficiency of the backlight module 200 is also greatly improved.

Furthermore, the framework assembly 300 in the present application further includes elastic materials, such as silicone, rubber, etc. In this way, after the framework assembly 300 and the light plates 220 are fixed on the back plate 210, the side edges of the light plates 220 abut against the framework assembly 300. When the lamp beads are heated for a long time and the light plates 220 expand, the light plates 220 can squeeze the framework assembly 300 to deform, but the light plates 220 will not abut each other, causing the light plates 220 to wrinkle or crack.

In the present application, the framework assembly 300 can be connected to the back plate 210 by means of snap-fit connection, screw connection, injection molding process, etc. In some embodiments, the framework assembly 300 may be directly injection-molded onto the back plate 210, which avoids manual installation and improves the stability of the back plate 210 and the framework assembly 300. Specifically, an elastic material is first heated to a melted state, and then a reflective material is added, which are then injection-molded onto the back plate 210 to connect with the back plate 210.

Figure 3:
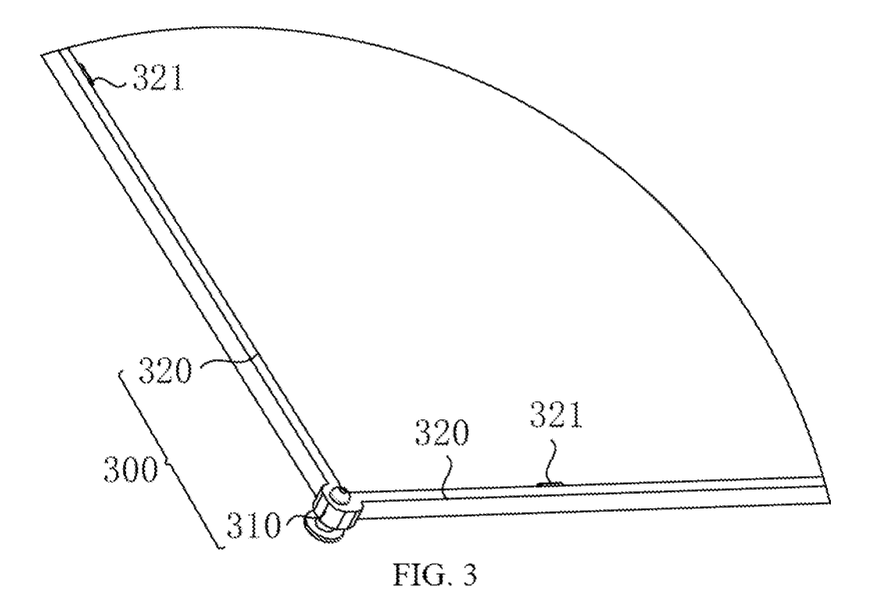
FIG. 3 is a partial schematic diagram of a framework assembly provided by the present application.

As shown in FIG. 2 and FIG. 3, the framework assembly 300 includes a plurality of support rods 310 and a plurality of frame rods 320. The plurality of support rods 310 are arranged in an array on the back plate 210 and are connected to the back plate 210. The support rods 310 are respectively disposed corresponding to the corners of the light plates 220. Adjacent support rods 310 are connected by a frame rod 320. At least part of the frame rods 320 are located in the seam 230. The support rods 310 and the frame rods 320 are formed together on the back plate 210 by an injection molding process. There may be only four support rods 310 in the framework assembly 300, which are only respectively located at four corners of the framework assembly 300, corresponding to the four corners of the back plate 210. The support rods 310 in the framework assembly 300 may also be arranged corresponding to the four corners of each light plate 220. In this case, a part of the support rods 310 are located at the meeting corners of two adjacent light plates 220, and another part of the support rods 310 are located at the meeting corners of four adjacent light plates 220. In this way, there are more connection points between the framework assembly 300 and the back plate 210, the connection effect with the back plate 210 is improved, and the stability is stronger.

The frame rods 320 are not only located in the seams 230, but also located outside the peripheral light plates 220, wrapping all the light plates 220. In this case, the framework assembly 300 has an alignment effect on all the light plates 220. Furthermore, the frame rods 320 can be connected and fixed to the back plate 210, and can be snap-fitted with the back plate 210 like the support rods 310. The frame rods 320 may also only abut against the front surface of the back plate 210. In this case, the support rods 310 are clamped to the back plate 210 from the back side of the back plate 210, that is, the side of the back plate 210 away from the light plates 220, while the frame rods 320 abut the back plate 210 from the front side of the back plate 210, that is, the side of the back plate 210 faces the light plates 220. That is, the framework assembly 300 exerts force on the back plate 210 from the front and back directions of the back plate 210. Even if the framework assembly 300 is in a relatively low temperature environment so that the framework assembly 300 becomes hard and the adhesion effect with the back plate 210 becomes poor, the framework assembly 300 will not shake relative to the back plate 210, which further ensures the stability of the framework assembly 300 on the back plate 210.

As shown in FIGS. 3, 4, 5, and 6, the back plate 210 is provided with a structure that cooperates with the framework assembly 300, which not only facilitates the injection molding of the framework assembly 300, but also improves the connection effect between the framework assembly 300 and the back plate 210. Specifically, the back plate 210 includes a plurality of clamping holes 211 and a plurality of grooves 212. The clamping holes 211 penetrate through the back plate 210. The support rods 310 are snap-connected to the clamping holes 211 in one-to-one correspondence. The grooves 212 are disposed on the side of the back plate 210 facing the light plates 220 and do not penetrate through the back plate 210. The frame rods 320 are matched with the grooves 212 in one-to-one correspondence. One end of each frame rod 320 is disposed in the respective groove 212 and abuts against the bottom of the groove 212. Furthermore, the positions of the bottom of the back plate 210 corresponding to the grooves 212 and the clamping holes 211 are also thickened, so as to prevent the back plate 210 from being thinned due to the opening of the grooves and the holes, thereby reducing the strength of the back plate 210. In terms of techniques, the back plate 210 can be partially thickened when the back plate 210 is formed, and then the corresponding grooves and holes can be processed to produce the forming the grooves 212 and the clamping holes 211. Alternatively, a common back plate 210 may be punched to partially sink the back plate 210, and then holes are opened to define the clamping holes 211 and the grooves 212.

Figure 4:
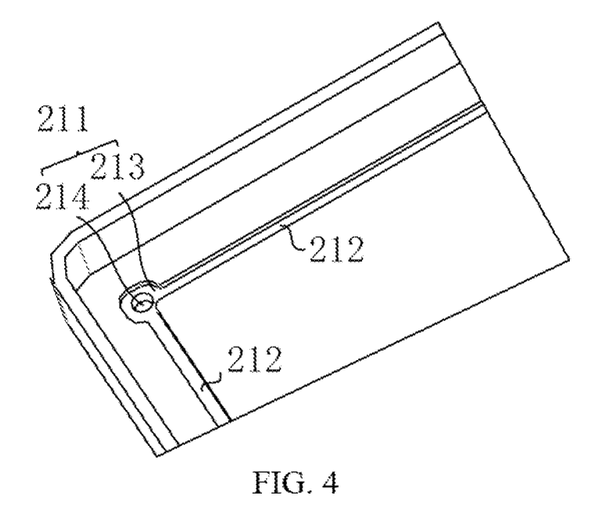
FIG. 4 is a partial schematic diagram of a back plate provided by the present application.

As shown in FIG. 4, the clamping hole 211 includes a sink hole 213 and a through hole 214 that are vertically in communication with each other. The sink hole 213 is disposed in the side of the back plate 210 facing the light plates 220. The depth of the sink hole 213 is equal to the depth of the groove 212. The side wall of the sink hole 213 is connected with the groove 212. The through hole 214 is disposed in the side of the back plate 210 away from the light plates 220. The cross-sectional dimension of the through hole 214 is smaller than the cross-sectional dimension of the sink hole 213. When the framework assembly 300 is injection molded on the back plate 210, the molten framework assembly 300 can flow into the clamping holes 211 everywhere through the molding grooves 212, so as to ensure that the thickness and height of the framework assembly 300 after molding are equal, which is beneficial to improve the stabilization effect of the framework assembly 300 itself, and the positioning effect of the light plates 220.

Figure 5:
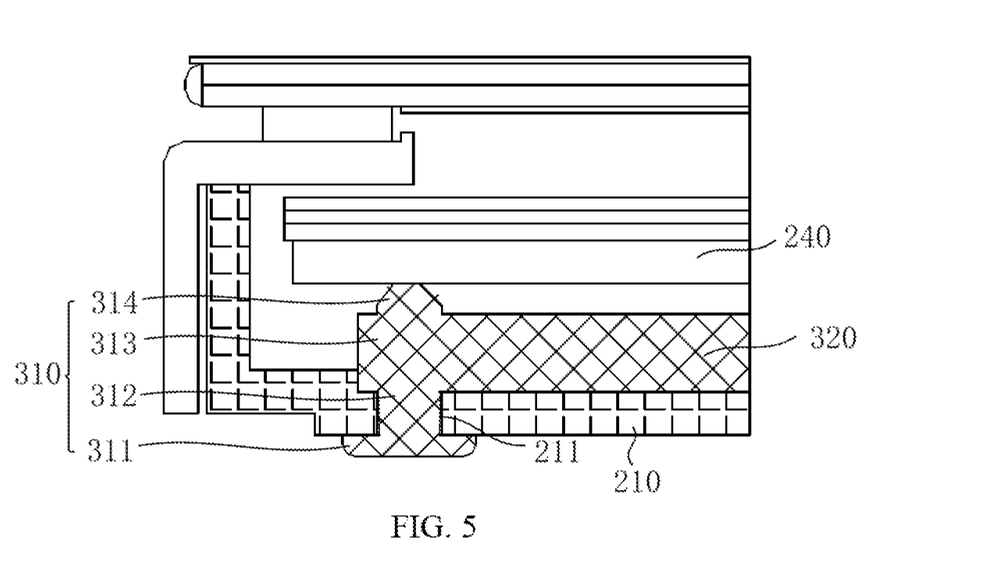
FIG. 5 is a first schematic cross-sectional view of a backlight module provided by the present application.
Figure 6:
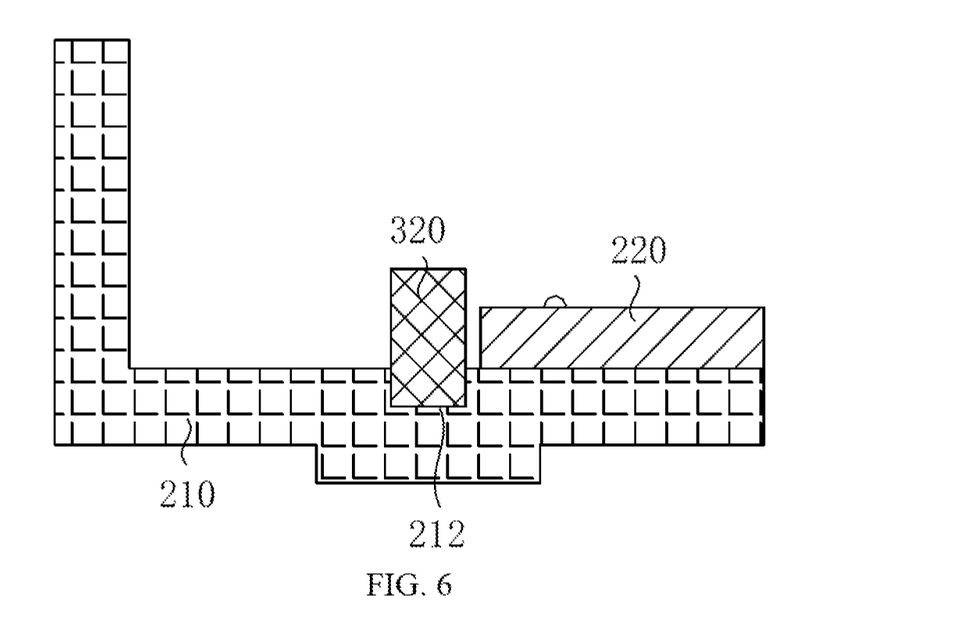
FIG. 6 is a second schematic cross-sectional view of a backlight module provided by the present application.

Accordingly, as shown in FIG. 5, the support rod 310 includes a first clamping portion 311, a transition portion 312 and a second clamping portion 313. The cross-sectional dimension of the first clamping portion 311 is larger than the cross-sectional dimension of the through hole 214, and is clamped to the side of the back plate 210 away from the light plates 220. The cross-section of the second clamping portion 313 corresponds to the cross-section of the sink hole 213, and is disposed on the side of the back plate 210 facing the light plates 220. The second clamping portion 313 is clamped with the bottom of the sink hole 213. The side wall of the second clamping portion 313 is connected to the frame rod 320. The shape of the transition portion 312 corresponds to the shape of the through hole 214. Two ends of the transition portion 312 are respectively connected with the first clamping portion 311 and the second clamping portion 313. Since on top of the clamping hole 211 is further provided with a sink hole 213 with a larger cross-sectional area, when the framework assembly 300 is injection-molded, the molten framework assembly 300 is more likely to gather in the sink hole 213, so that the second clamping portion 313 has a larger area and a higher thickness. In this way, the strength of the support rod 310 is higher, and the effect of engaging with the back plate 210 is improved. Of course, the back plate 210 may also not have the sink hole 213, and the through hole 214 can be directly used to penetrate the back plate 210 to form the clamping hole 211, and the second clamping portion 313 is snap-fitted with the front of the back plate 210.

The backlight module 200 further includes at least an optical assembly 240, and of course structures such as a rubber frame and a foam can also be included. The optical assembly 240 is disposed on the side of the light plates 220 away from the back plate 210. Further, the support rod 310 further includes a bearing portion 314. The bearing portion 314 is disposed at an end of the second clamping portion 313 away from the first clamping portion 311 and abuts against the optical assembly 240. As shown in FIG. 5, by disposing the bearing portion 314, the light plates 220 can be spaced apart from the optical assembly 240. In other words, the bearing portion 314 increases the height of the support rod 310 so that the support rod 310 can protrude from the side of the light plates 220 away from the back plate 210. In this case, the bearing portion 314 increases the light mixing distance of the backlight module, so that the optical assembly 240 is not directly stacked on the light plates 220, thereby avoiding lamp shadows and making the backlight module 200 emit light more uniformly.

The bearing portion 314 can have various configurations. For example, the bearing portion 314 may be integrally formed with the support rod 310. In this case, the bearing portion 314, the first clamping portion 311, the transition portion 312, and the second clamping portion 313 are of an integral one-piece structure. Alternatively or additionally, the bearing portion 314 may also be connected to the second clamping portion 313 by means of bonding, snap-fitting, or the like.

Figure 7:
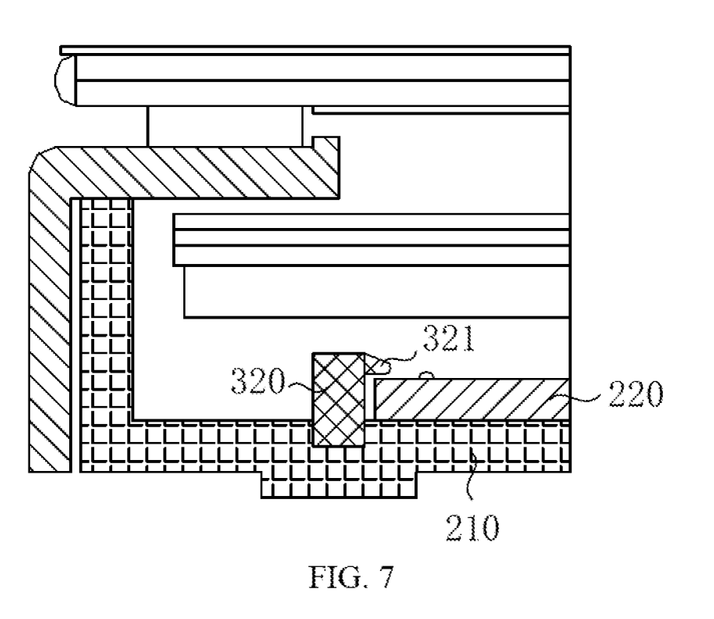
FIG. 7 is a third schematic cross-sectional view of a backlight module provided by the present application.

As shown in FIG. 3 and FIG. 7, the frame rod 320 includes a hook 321. The hook 321 is disposed at the end of the frame rod 320 away from the back plate 210. The hook 321 is snap-fitted with a side of the light plate 220 away from the back plate 210. At least two hooks 321 can be disposed on one side of each frame rod 320 to improve the fixing effect on the respective light plate 220. Furthermore, since the hook 321 also has elasticity as the framework assembly 300 and is formed by an elastic material, when the light plate 220 is installed, although the hook 321 will be squeezed, the hook 321 will not be damaged, nor will the installation of the light plate 220 be hindered. After the light plate 220 is installed, the hook 321 fixes the light plate 220 onto the back plate 210, and no other structure is required to fix the light plate 220. Nowadays, most of the light plates 220 are fixed on the back plate 210 by bonding or screwing. Using the design of the hook 321 of the present application not only saves cost and material, but also greatly improves the assembly efficiency of the backlight module 200. When the light plate 220 needs to be disassembled, the light plate 220 can also be directly taken out from the framework assembly 300, which can ensure the disassembly efficiency of the light plate 220 without damaging any structure.

Figure 8:
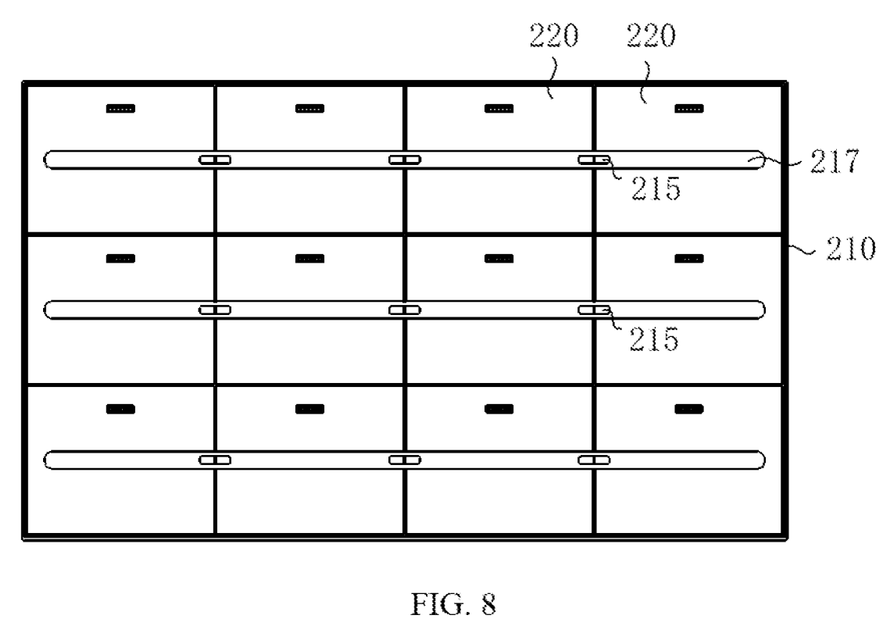
FIG. 8 is a schematic diagram of a back of a back plate provided by the present application.
Figure 9:
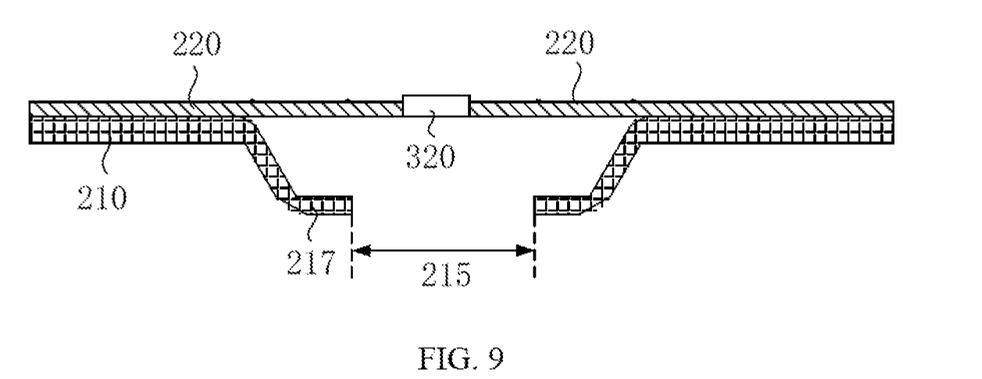
FIG. 9 is a fourth schematic cross-sectional view of a backlight module provided by the present application.

As shown in FIG. 8 and FIG. 9, the back plate 210 includes a plurality of removal holes 215. The cross section of the removal hole 215 can be circular, oval, square or other shapes. The removal hole 215 penetrates through the back plate 210 and is disposed at the seam 230. Along the width direction of the seam 230, the size of the removal hole 215 is larger than the width size of the frame rod 320. The frame rod 320 and the two adjacent light plates 220 cover the removal hole 215, that is, both ends of the removal hole 215 overlap the edges of the two adjacent light plates 220. When a light plate 220 needs to be replaced, the edge of the light plate 220 can be pushed up from the back of the back plate 210 through the removal hole 215 by a jig, so that the light plate 220 can be easily taken out from the framework assembly 300 without damaging the lamp beads on the light plate 220. Since the removal hole 215 is located at the seam 230 and the size of the removal hole 215 is larger than the width of the seam 230, the removal hole 215 overlaps the edge of the light plate 220, so that the edge of the light plate 220 can be lifted. Compared with the solution in which the removal hole 215 is corresponding to the central region of the light plate 220, the present application makes the dismounting hole 215 at the seam 230, which is more convenient to clamp the edge of the light plate 220 to take out the whole light plate 220. Furthermore, one dismounting hole 215 corresponds to two light plates 220, and the edges of the two light plates 220 can be lifted from the one dismounting hole 215 to achieve the purpose of taking out the two light plates 220 at the same time. Furthermore, it is also beneficial to reduce the number of the dismounting holes 215 and avoid the reduction of the strength of the back plate 210.

Furthermore, the back plate 210 is provided with a plurality of raised portions 217. The raised portion 217 protrudes in a direction away from the light plates 220. By adding the raised portion 217, firstly, the raised portion 217 can form a cavity with the housing of the backlight module 200, which is convenient for accommodating other chip structures, and secondly, the strength of the back plate 210 can be increased. When the design of the dismounting hole 215 overlaps the raised portion 217, when making the dismounting hole 215, the structure of the back plate 210 corresponding to the raised portion 217 can be directly penetrated, which has no impact on the back plate 210.

Figure 10:
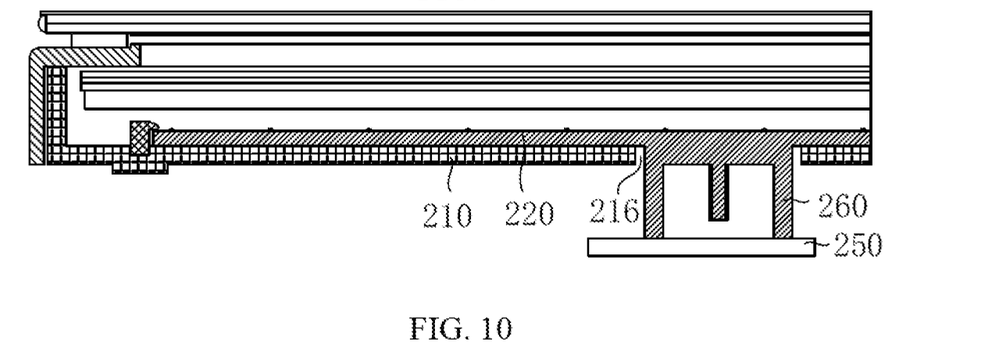
FIG. 10 is a fifth schematic cross-sectional view of a backlight module provided by the present application.

As shown in FIG. 10, the back plate 210 further includes a plurality of connecting holes 216. The connecting holes 216 penetrate through the back plate 210, correspond to the light plates 220 one-to-one, and are located directly below the light plates 220. The backlight module 200 further includes a backlight control chip 250 and a connector 260. The connector 260 passes through the connecting hole 216 to connect the backlight control chip 250 and the light plate 220. Compared with the solution where in the backlight module 200, the wirings connected to the light plates 220 are wound from the front of the back plate 210 to the back of the back plate 210 before then connected to the backlight control chip 250, in the present application, by setting the connecting holes 216 in the back plate 210, the wiring of the light plate 220 is directly guided from the front of the back plate 210 to the back of the back plate 210 through the connecting holes 216, which greatly reduces the length of the wiring and avoids the problem of messy wirings.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A backlight module, comprising:
    a back plate; and
    a plurality of light plates arranged on the back plate, wherein a seam is formed between every two adjacent light plates; and
    a framework assembly, fixed to the back plate and arranged surrounding the plurality of light plates; wherein at least part of the framework assembly is arranged in the seam, and wherein a material of the framework assembly comprises a reflective material.

2. The backlight module of claim 1, wherein the framework assembly comprises a plurality of support rods and a plurality of frame rods, wherein the plurality of support rods are arranged in an array on the back plate and are connected to the back plate;
    wherein the plurality of support rods are respectively disposed corresponding to corners of the respective light plates, wherein adjacent support rods are connected by a respective frame rod, and wherein at least part of the frame rods are disposed in the respective seams.

3. The backlight module of claim 2, wherein the plurality of support rods are disposed at four corners of the framework assembly.

4. The backlight module of claim 2, wherein the plurality of support rods are disposed corresponding to four corners of each of the plurality of light plates.

5. The backlight module of claim 2, wherein the plurality of support rods are each clamped with the side of the back plate facing away from the plurality of light plates, wherein the plurality of frame rods abut against the side of the back plate facing towards the plurality of light plates.

6. The backlight module of claim 5, wherein the back plate comprises a plurality of clamping holes and a plurality of grooves, and wherein the plurality of support rods are clamped in one-to-one correspondence with the plurality of clamping holes;
wherein the plurality of grooves are defined in a side of the back plate facing the plurality of light plates and do not penetrate the back plate;
wherein the plurality of frame rods are matched and fitted with the plurality of grooves in one-to-one correspondence, and wherein one end of each frame rod is arranged in the respective groove and abuts with a groove bottom of the groove.

7. The backlight module of claim 6, wherein each clamping hole comprises a sink hole and a through hole that are vertically coupled, wherein the sink hole is defined in a side of the back plate facing the plurality of light plates, a depth of the sink hole is equal to a depth of the respective groove, and a side wall of the sink hole is connected with the respective groove;
wherein the through hole is defined in a side of the back plate away from the plurality of light plates, and wherein a cross-sectional dimension of the through hole is less than a cross-sectional dimension of the sink hole.

8. The backlight module of claim 7, wherein the support rod comprises a first clamping portion, a transition portion, and a second clamping portion; wherein a cross-sectional dimension of the first clamping portion is larger than a cross-sectional dimension of the through hole, and the first clamping portion is clamped to the side of the back plate away from the plurality of light plates;
wherein a cross-section of the second clamping portion corresponds to a cross-section of the sink hole, and the second clamping portion is arranged on the side of the back plate facing the plurality of light plates, wherein the second clamping portion is clamped with a bottom of the respective sink hole, and a side wall of the second clamping portion is connected with the respective frame rods;
wherein a shape of the transition portion corresponds to and is congruent with a shape of the through hole, and wherein both ends of the transition portion are respectively connected to the first clamping portion and the second clamping portion.

9. The backlight module of claim 8, further comprising an optical assembly disposed on a side of the plurality of light plates away from the back plate;
wherein each support rod further comprises a bearing portion disposed at an end of the respective second clamping portion away from the respective first clamping portion, and wherein the bearing portion abuts with the optical assembly.

10. The back light module of claim 9, wherein the bearing portion, the first clamping portion, the transition portion, and the second clamping portion are integrally formed as one piece.

11. The backlight module of claim 2, wherein each frame rod comprises at least one hook disposed at an end of the frame rod away from the back plate, and the at least one hook is engaged with a side of the respective light plate away from the back plate.

12. The backlight module of claim 11, wherein the hook is formed of an elastic material.

13. The backlight module of claim 11, wherein at least two hooks are disposed on one side of each of the plurality of frame rods.

14. The backlight module of claim 2, wherein the back plate comprises a plurality of removal holes, which penetrate through the back plate and are disposed at the seam;
wherein along a width direction of the seam, a size of the removal hole is larger than a width dimension of the respective frame rod, and wherein the respective frame rod and respective two adjacent light plates jointly cover the removal hole.

15. The backlight module of claim 1, wherein a material of the framework assembly further comprises an elastic material.

16. The backlight module of claim 15, wherein the framework assembly is injection-molded on the back plate.

17. The backlight module of claim 1, wherein the back plate further comprises a plurality of connecting holes, which penetrate through the back plate, are in one-to-one correspondence with the plurality of light plates, and are located directly below the respective light plates;
wherein the backlight module further comprises a backlight control chip and a connector, wherein the connector passes through the connecting hole and couples the backlight control chip to the respective light plate.

18. The backlight module of claim 1, wherein a plurality of raised portions are formed on the back plate and protrude in a direction away from the plurality of light plates.

19. A backlight module, comprising a back plate and a plurality of light plates arranged on the back plate, wherein a seam is formed between every two adjacent light plates; wherein the back plate comprises:
a plurality of grooves, which are defined in a side of the back plate facing the plurality of light plates and which do not penetrate through the back plate; and
a plurality of clamping holes, each of which comprising a sink hole and a through hole that are vertically coupled, wherein the sink hole is defined in a side of the back plate facing the plurality of light plates, a depth of the sink hole is equal to a depth of the respective groove, and a side wall of the sink hole is connected with the respective groove; wherein the through hole is defined in a side of the back plate facing away from the plurality of light plates, and wherein a cross-sectional dimension of the through hole is less than a cross-sectional dimension of the sink hole;
wherein the backlight module further comprises a framework assembly, which is integrally formed as one piece and is injection-molded on the back plate, wherein a material of the framework assembly further comprises a reflective material; wherein the framework assembly comprises:
a plurality of support rods, which are arranged in an array on the back plate and disposed corresponding to four corners of each of the plurality of light plates, and are connected to the back plate; wherein each support rod comprises a first clamping portion, a transition portion, a second clamping portion, and a bearing portion that are successively connected to each other; wherein a cross-sectional dimension of the first clamping portion is greater than a cross-sectional dimension of the through hole, and the first clamping portion is connected to the side of the back plate facing away from the plurality of light plates; wherein a cross-section of the second clamping portion corresponds to a cross-section of the sink hole, and the second clamping portion is arranged on the side of the back plate facing towards the plurality of light plates, and wherein the second clamping portion is clamped with a bottom of the respective sink hole; wherein a shape of the transition portion corresponds to and is congruent with a shape of the through hole, and wherein both ends of the transition portion are respectively connected to the first clamping portion and the second clamping portion; wherein the bearing portion is disposed at an end of the respective second clamping portion away from the respective first clamping portion;

a plurality of frame rods, matched and fitted with the plurality of grooves in one-to-one correspondence, wherein one end of each frame rod is arranged in the respective groove and abuts with a groove bottom of the groove; and wherein a hook formed of an elastic material is disposed at another end of the frame rod, and is snap-fitted with the side of the respective light plate facing away from the back plate; wherein sidewalls of two adjacent second clamping portions are connected to each other by one of the plurality of frame rods.

20. A display device, comprising a display panel and a backlight module, wherein the display panel is disposed on a light-emitting side of the backlight module, wherein the backlight module comprises:

a back plate; and a plurality of light plates arranged on the back plate, wherein a seam is formed between every two adjacent light plates; and a framework assembly, fixed to the back plate and arranged surrounding the plurality of light plates; wherein at least part of the framework assembly is arranged in the seam, and wherein a material of the framework assembly comprises a reflective material.

* * * * *

UNITED STATES PATENT AND TRADEMARK OFFICE
CERTIFICATE OF CORRECTION

PATENT NO. : 11,927,843 B2
APPLICATION NO. : 18/078012
DATED : March 12, 2024
INVENTOR(S) : Xiaolan Tong Page 1 of 1

It is certified that error appears in the above-identified patent and that said Letters Patent is hereby corrected as shown below:

On the Title Page

Column 1, Item (30) Foreign Application Priority Data field, insert --December 31, 2021 (CN) 202111675432--.

Signed and Sealed this
Seventh Day of January, 2025

Derrick Brent
*Acting Director of the United States Patent and Trademark Office*